(No Model.)
H. HITCHCOCK.
DRAFT EQUALIZER.
No. 428,608. Patented May 27, 1890.
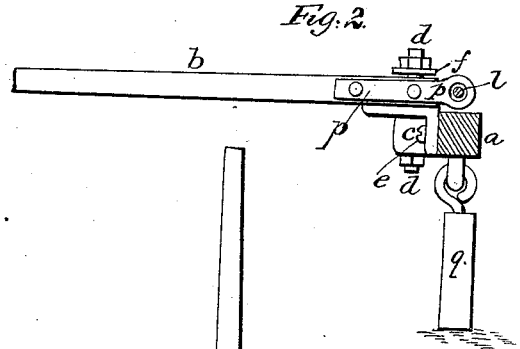
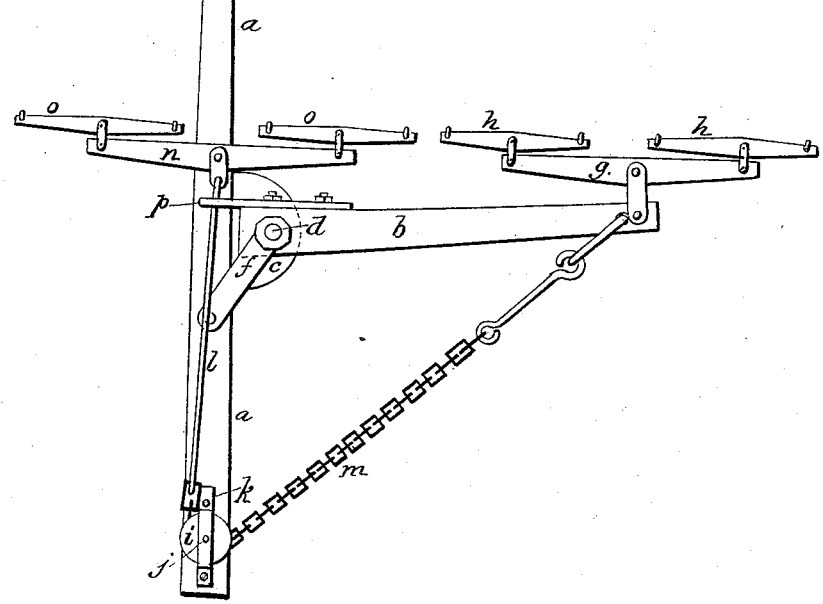
Witnesses
L. B. Brock
Y. M. Copenhaver
Inventor
Howard Hitchcock
by F. B. Brock,
Attorney

UNITED STATES PATENT OFFICE.

HOWARD HITCHCOCK, OF REINBECK, IOWA.

DRAFT-EQUALIZER.

SPECIFICATION forming part of Letters Patent No. 428,608, dated May 27, 1890.

Application filed December 10, 1889. Serial No. 333,222. (No model.)

*To all whom it may concern:*

Be it known that I, HOWARD HITCHCOCK, a citizen of the United States, residing at Reinbeck, in the county of Grundy and State of Iowa, have invented certain new and useful Improvements in Draft-Equalizers; and I do declare the following to be a full, clear, and exact description of the invention, such as will enable others skilled in the art to which it appertains to make and use the same, reference being had to the accompanying drawings, and to the letters of reference marked thereon, which form a part of this specification.

My invention relates to draft equalizers and eveners.

The object of my improvements is to provide a means for equalizing the draft of three, four, or more horses when hitched abreast of each other.

To effect this purpose my invention consists in the following construction and combination of devices, which will first be fully described, and then claimed in the following specification.

Figure 1 represents a plan view of a draft-equalizer embodying my invention, and Fig. 2 is a detail section and front elevation of the same.

$a$ represents the tongue or pole of a vehicle.

$b$ represents a pivoted arm or lever swung off to one side of the tongue.

$c$ is the bracket, to which the arm $b$ is hinged by the pivot $d$.

$e$ are bolts uniting bracket $c$ to the tongue $a$.

$f$ is an arm secured to the tongue and extended over the bracket $c$, where the pivot-bolt passes through it to steady the arm $b$.

$g$ is a whiffletree pivoted to the outer end of arm $b$.

$h$ are singletrees attached to the outer ends of whiffletree $g$ in the usual way.

$i$ is a pulley located on the inner end of the tongue on a journal $j$, passing through the tongue and supported at the upper end by a strap $k$, bolted to the tongue.

$l$ is a rod located upon the tongue and adapted to have a lengthwise movement thereon.

$m$ is a chain or rope attached at one end to the inner end of rod $l$ and at the other to the outer end of arm $b$ and passing around the pulley $i$.

$n$ is a whiffletree pivoted upon the outer end of rod $l$, and $o$ are singletrees upon each end thereof, whereby a horse may be yoked or hitched upon each side of the tongue in the usual manner.

$p$ is a guide-bracket rigidly secured to the arm $b$ and oscillating therewith, through which the rod $l$ passes, serving to guide and steady the movement of the rod when the equalizer is in operation. This bracket may be varied in its position from one side to the other.

When four horses are hitched abreast in two pairs, one pair has the pole or tongue between them and the other pair travel off at one side in front of singletrees $h\ h$. The arrangement of my device is such as will be seen that the draft of each pair of horses is equalized.

$q$ is a tongue-rest for the pole, having a universal joint, and attached to the tongue on its under side. When the horses are hitched up, the rest $q$ is raised from the ground and swings free, so that in striking any obstruction it will swing back and forth and clear it.

What I claim is—

The combination, in a draft-equalizer, of the pole or shaft, a pulley carried upon the pole, a side lever pivoted to the pole, a chain or other connection attached to the outer end of the lever at one end and to a rod at the other and passing over the pulley, a rod-guide secured to the pivoted lever, and a rod passing through the rod-guide and attached at one end to the whiffletree and at the other to the chain, substantially as set forth.

In testimony whereof I affix my signature in presence of two witnesses.

HOWARD HITCHCOCK.

Witnesses:
JAMES E. BURRTT,
WM. J. HARRISON.